US009396101B2

(12) United States Patent
Fitzpatrick et al.

(10) Patent No.: US 9,396,101 B2
(45) Date of Patent: *Jul. 19, 2016

(54) SHARED PHYSICAL MEMORY PROTOCOL

(75) Inventors: Michael G. Fitzpatrick, Raleigh, NC (US); Michael J. Fox, New Hill, NC (US); Maurice Isrel, Jr., Raleigh, NC (US); Constantinos Kassimis, Cary, NC (US); Donald W. Schmidt, Stone Ridge, NY (US); Benjamin P. Segal, Hyde Park, NY (US); Jerry W. Stevens, Raleigh, NC (US); Todd E. Valler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

This patent is subject to a terminal disclaimer.

(21) Appl. No.: 13/494,837

(22) Filed: Jun. 12, 2012

(65) Prior Publication Data

US 2013/0332677 A1    Dec. 12, 2013

(51) Int. Cl.
  *G06F 3/00* (2006.01)
  *G06F 12/00* (2006.01)
  *G06F 3/06* (2006.01)
  *G06F 9/54* (2006.01)

(52) U.S. Cl.
  CPC ............... *G06F 12/00* (2013.01); *G06F 3/065* (2013.01); *G06F 9/544* (2013.01)

(58) Field of Classification Search
  None
  See application file for complete search history.

(56) References Cited

U.S. PATENT DOCUMENTS

| 5,701,413 | A  | 12/1997 | Zulian et al. |
| 6,347,337 | B1 | 2/2002  | Shah et al. |
| 6,721,806 | B2 | 4/2004  | Boyd et al. |
| 7,114,096 | B2 | 9/2006  | Freimuth et al. |
| 7,551,614 | B2 | 6/2009  | Teisberg et al. |
| 7,580,415 | B2 | 8/2009  | Hudson et al. |
| 7,971,236 | B1 | 6/2011  | Lentini |
| 8,473,692 | B2 | 6/2013  | Rosales et al. |
| 8,627,136 | B2 | 1/2014  | Shankar et al. |
| 2003/0037178 | A1 | 2/2003 | Vessey et al. |

(Continued)

FOREIGN PATENT DOCUMENTS

WO   WO0036509 A2   6/2000

OTHER PUBLICATIONS

Kisskimis, Gus; Update of Optimized Communications within zEnterprise; ze-Business Leaders Council; Lisbon, Portugal; May 23-27, 2011.

(Continued)

*Primary Examiner* — Henry Tsai
*Assistant Examiner* — Dean Phan
(74) *Attorney, Agent, or Firm* — Parashos Kalaitzis; Robert C. Rolnik

(57) ABSTRACT

A computer implemented program product and data processing system for receiving data to a targeted logical partition. A computer locates buffer element in reliance on a connection status bit array. The computer copies control information to the targeted logical partition's local storage. The computer updates a targeted logical partition's local producer cursor based on the control information. The computer copies data to an application receive buffer. The computer determines that an application completes a receive operation. Responsive to a determination that the application completed the receive operation, the computer a targeted logical partition's local consumer cursor to match the targeted logical partition's producer cursor.

6 Claims, 11 Drawing Sheets

(56) References Cited

U.S. PATENT DOCUMENTS

| | | |
|---|---|---|
| 2003/0061417 A1* | 3/2003 | Craddock et al. ............... 710/54 |
| 2004/0022262 A1* | 2/2004 | Vinnakota et al. ............ 370/429 |
| 2004/0049774 A1 | 3/2004 | Boyd et al. |
| 2006/0129676 A1 | 6/2006 | Modi et al. |
| 2006/0168274 A1 | 7/2006 | Aloni et al. |
| 2006/0265521 A1 | 11/2006 | Boyd et al. |
| 2007/0028138 A1 | 2/2007 | Noya et al. |
| 2007/0060366 A1 | 3/2007 | Morrow et al. |
| 2008/0034418 A1 | 2/2008 | Venkatraman |
| 2008/0140877 A1* | 6/2008 | Baba et al. ...................... 710/23 |
| 2009/0271796 A1* | 10/2009 | Kojima ........................ 718/103 |
| 2010/0217916 A1 | 8/2010 | Gao et al. |
| 2012/0198188 A1 | 8/2012 | Coronado et al. |
| 2013/0031341 A1 | 1/2013 | Ganti et al. |
| 2013/0332677 A1 | 12/2013 | Fitzpatrick et al. |

OTHER PUBLICATIONS

Schell, Joseph, Office Action U.S. Appl. No. 13/494,831, Mar. 27, 2014.

Rolnik, Robert, Response to Office Action U.S. Appl. No. 13/494,831, Apr. 4, 2014.

Dean Phan, FinalOfficeAction_Nov. 5, 2015.

\* cited by examiner

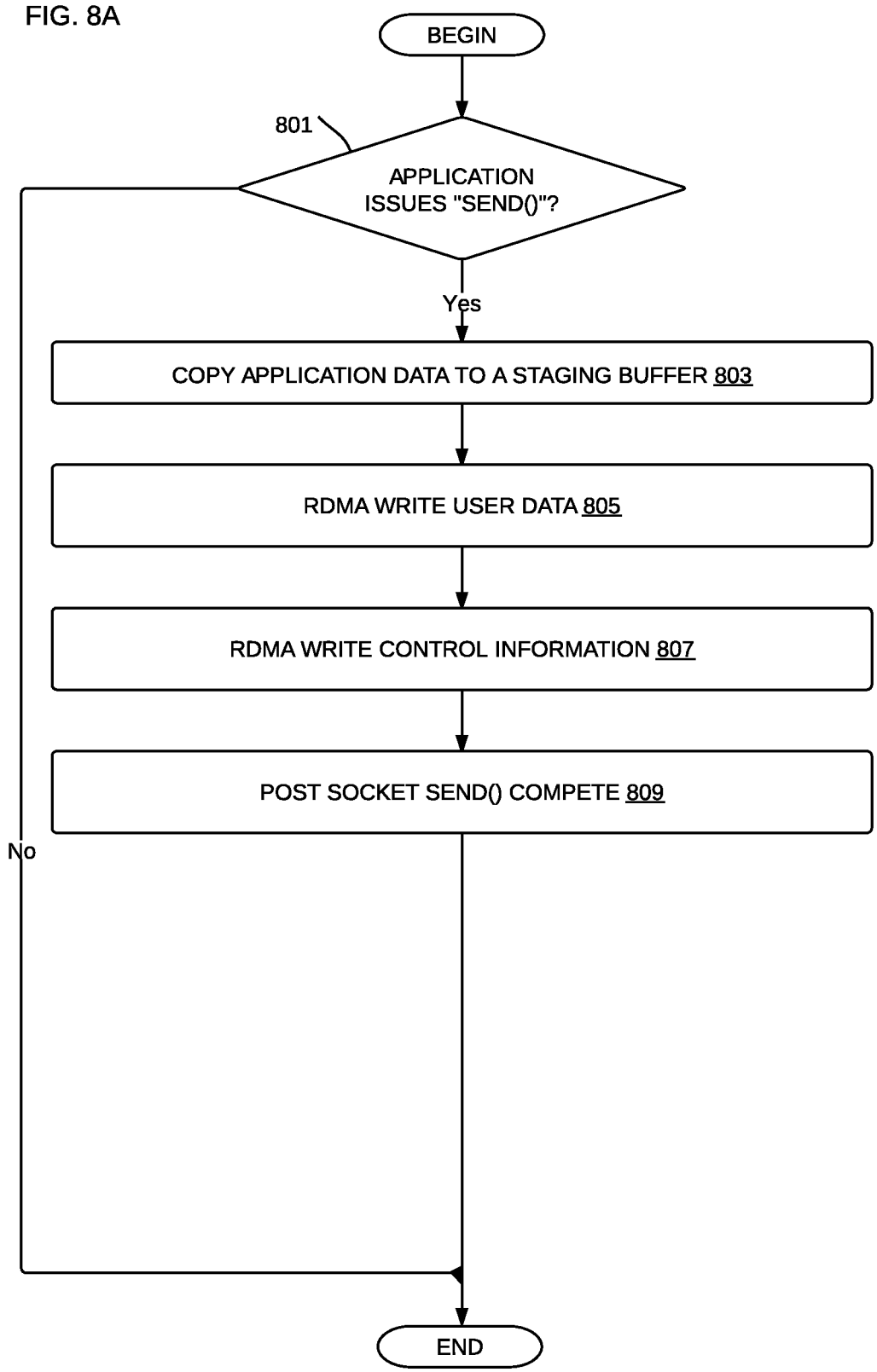

SHARED PHYSICAL MEMORY PROTOCOL

BACKGROUND

The present invention relates generally to the field of data communication and networking, and more particularly to methods, systems, and computer program products that communicate within a Central Electronic Complex (CEC) and between CECs InfiniBand™ and RDMA over Enhanced Converged Ethernet (RoCE) provide support for Remote Direct Memory Access (RDMA) technology are existing, known technologies for high speed connectivity between hosts and servers. InfiniBand is a trademark of the InfiniBand Trade Association. These technologies are implemented in a networking environment with additional hardware and corresponding software, including drivers and application programming interfaces. This means that using these high-speed technologies requires server programs, applications, and clients to code to specific low level APIs to exploit them. For example, instead of sockets, User Direct Access Programming Library (UDAPL) would be used to communicate using InfiniBand.

There is a large existing base of servers, applications, and clients that are coded to the TCP/IP sockets interface for communication. For these programs to exploit high speed interconnects in the current art, significant rewriting of their communication methods would be required. This is a major undertaking and may not even be practical in some cases (for example legacy applications whose source code or coding skill is lost). In addition to the implementation cost and long term cost of sustaining multiple APIs in each application, new and unique network administrative requirements must be addressed (e.g. configuration, enablement, High Availability, security, network load balancing, and various TCP/IP related Quality of Services (e.g. SSL)).

The current state of the art solution for this problem is Sockets Direct Protocol (SDP), which bypasses TCP/IP and provides an alternative protocol stack "underneath" the sockets layer. This solution allows applications, which are coded to the widely adopted sockets standard, to run unmodified and the SDP stack under the sockets layer handles all the communication. However, businesses still rely on legacy firewalls, load balancers, and other technologies to manage and secure their networks. These technologies rely on the ability to manage TCP/IP setup flows to perform their function. Because SDP dispenses with these flows, these network elements would have to be reinvented for SDP. Additionally, many TCP/IP stacks are mature products with built-in security, quality of service, tracing, and auditing, etc. capabilities that have no corresponding feature in SDP.

Because of these limitations, SDP is perceived as unsuitable for multi-tier enterprise level business environments with complicated security, high availability and quality of service requirements.

SUMMARY

A method for exchanging data with a targeted host using a shared memory communications model. A shared memory communication (SMC) component provides a transparent sockets based communications solution in two variations; a local variation (when the virtual hosts reside on the same physical compute platform having direct access to the same physical memory) by locating a shared memory buffer element in reliance on a connection status bit array and a remote variation (when the virtual servers reside on separate physical compute platforms) by locating a remote memory buffer element in reliance on RDMA technology. In both variations the SMC component copies control information to the targeted host's storage (shared memory buffer element (SMBE for local or remote memory buffer element (RMBE for remote). The SMC component updates a targeted logical partition's local producer cursor based on the control information. The SMC component alerts the targeted host indicating data is available to be consumed. The SMC component copies application data to an application receive buffer. The SMC component determines that an application completes a receive operation. The SMC component, updating the targeted logical partition's local consumer cursor to match the targeted logical partition's producer cursor, responsive to a determination that the application completed the receive operation.

An illustrative embodiment provides a computer implemented method, program product and data processing system for receiving data to a targeted logical partition. A computer locates buffer element in reliance on a connection status bit array. The computer copies control information to the targeted logical partition's local storage. The computer updates a targeted logical partition's local producer cursor based on the control information. The computer copies data to an application receive buffer. The computer determines that an application completes a receive operation. Responsive to a determination that the application completed the receive operation, the computer a targeted logical partition's local consumer cursor to match the targeted logical partition's producer cursor.

A further illustrative embodiment provides a computer implemented method for dispatching data from a logical partition. The computer detects an application issued send operation. Responsive to detecting the application issued send operation, the computer moves data to a buffer assigned to a targeted logical partition, wherein the buffer is one selected from the group consisting of a shared memory buffer (SMB) and a remote memory buffer (RMB). The computer updates a shared memory buffer header connection status bit array (CSBA) with details of the data. The computer issues an interrupt signal to the targeted logical partition. The computer returns program control to the application.

BRIEF DESCRIPTION OF THE SEVERAL VIEWS OF THE DRAWINGS

FIG. 8A is a flowchart of RDMA send processing in accordance with an illustrative embodiment of the invention;

DETAILED DESCRIPTION

Figure 1:
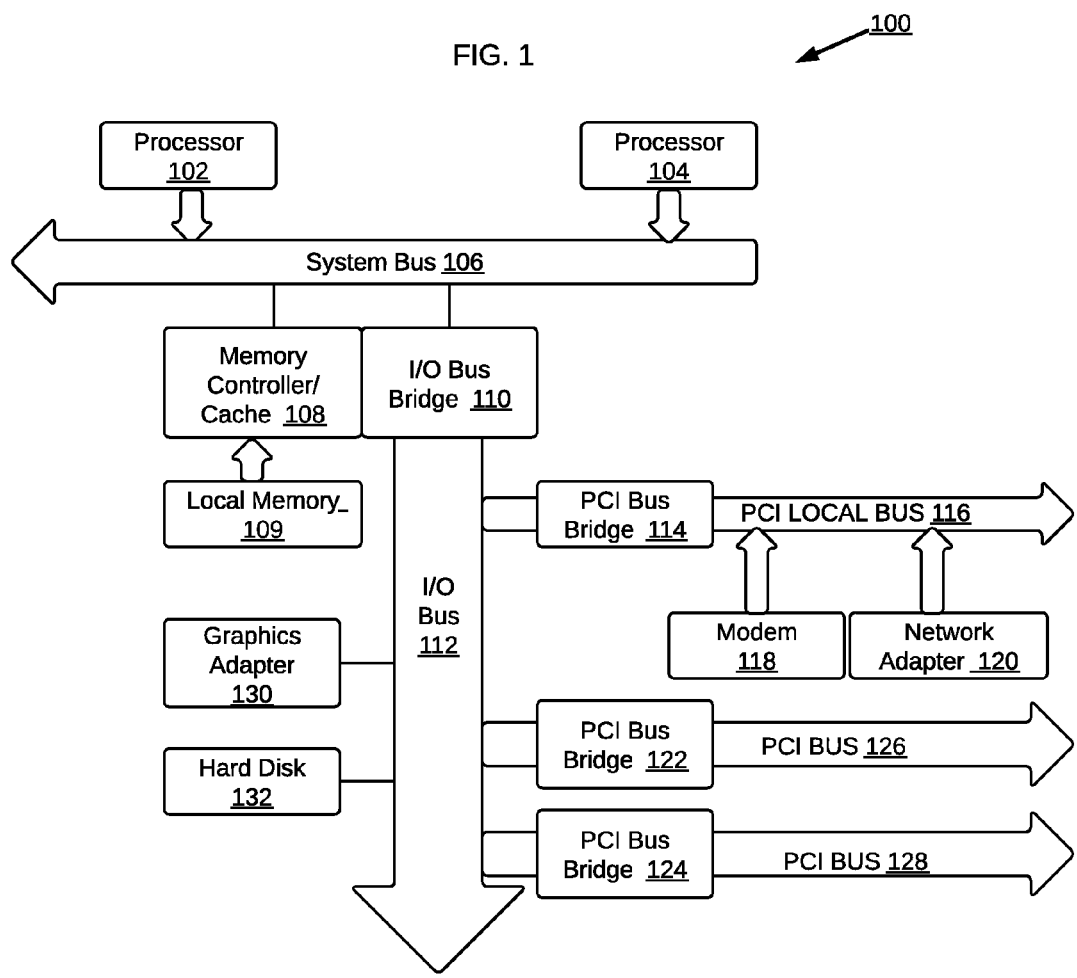
FIG. 1 is a block diagram of a data processing system in accordance with an illustrative embodiment of the invention.

FIG. 1 is a block diagram of a data processing system in accordance with an illustrative embodiment of the invention. Data processing system 100 may be a symmetric multiprocessor (SMP) system including a plurality of processors 102 and 104 connected to system bus 106. Alternatively, a single processor system may be employed. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems may be connected to PCI local bus 116. Typical PCI bus implementations will support four PCI expansion slots or add-in connectors. Communication links to networks may be provided through modem 118 or network adapter 120 connected to PCI local bus 116 through add-in boards. Additional PCI bus bridges 122 and 124 provide interfaces for additional PCI local buses 126 and 128, respectively, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 1 may be, for example, an IBM® System z® server running z/OS or Linux™, or an IBM P Server running the Advanced Interactive Executive (AIX™) operating system or Linux. AIX, P Server, and System z are trademarks or registered trademarks of International Business Machines Corporation. Linux is a trademark of Linus Torvalds.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

Some illustrative embodiments provide a path for high performance communications between logical partitions residing in a common central electronic complex (CEC). For logical partitions (LPARs) that communicate within the CEC, memory may be dedicated for use in a local direct memory access (DMA) configuration. As such, the memory, so dedicated, can be partitioned away from the existing physical memory. New software communication protocols, such as shared memory communications protocol, are defined to exploit this new form physical memory. Such protocols use this physical memory arranged as a shared memory pool. Efficiencies between LPARS can thus be comparable to program-to-program call architecture performed within an LPAR or within a single operating system image, at least by some illustrative embodiments.

Figure 2:
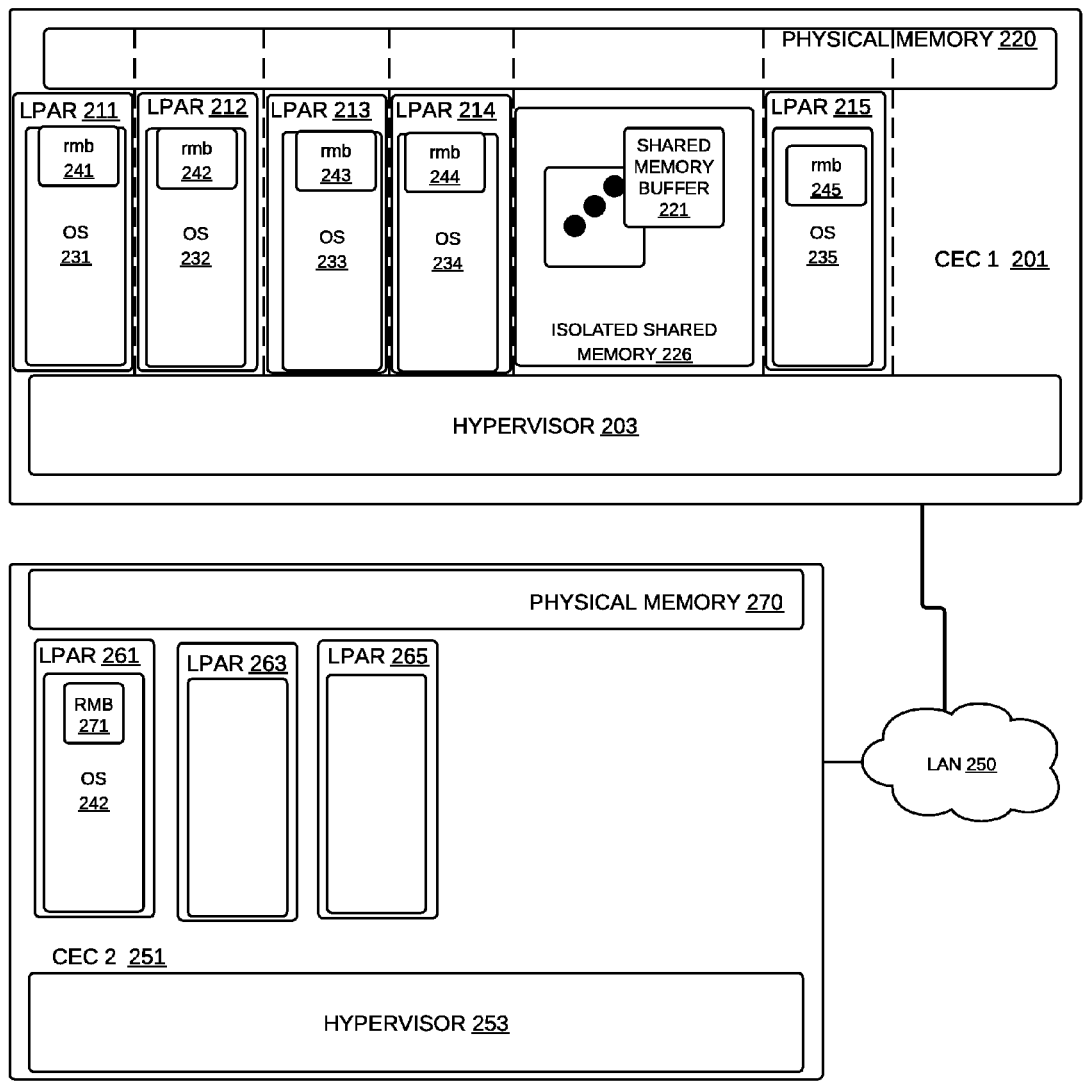
FIG. 2 is a block diagram of a logical arrangement of logical partitions within one or more Central Electronic Complexes (CEC) in accordance with an illustrative embodiment of the invention.

FIG. 2 is a block diagram of a logical arrangement of logical partitions within one or more Central Electronic Complexes (CEC) in accordance with an illustrative embodiment of the invention. A CEC is a data processing system that provides a common system bus, for example, in the manner of data processing system 100 and system bus 106 of FIG. 1. FIG. 2 depicts a logical arrangement of logical partitions within one or CECs where a hypervisor allocates resources such as memory to one or more logical partitions or LPARs. A hypervisor is a software component of a host data processing system, for example, data processing system 100 of FIG. 1 that permits multiple logical partitions to be executed using the resources of the host data processing system.

The interaction of a logical partition with an operating system image can result in a practical application, namely an operating system. Each of these three terms, LPAR, operating system image and operating system, will now be defined and shown to cooperate with each other.

A logical partition, or LPAR, (sometimes called a virtual machine) is an isolated collection of data processing system resources. The logical partition can be organized by a hypervisor that regulates hardware access to that memory, storage and communication resources as established in a table or other data structure. Accordingly, the logical partition may have a serial number or other identifier for internal housekeeping and identity functions that allow the hypervisor, and helper software components to permit access to resources as needed based on the identity of the abstracted logical partition.

An operating system image is the computer instructions stored to files that describe how to convert a general purpose computer or the specific resources of a logical partition to low level and utility access of such resources by a user or the applications operated by the user. At a high level, these computer instructions, when coupled to such computer or LPAR, can permit authentication, authorization, storage access, memory access, processor and thread access, access to peripherals and I/O, and other functions that permit applications to perform work useful to users and/or additional applications.

An operating system, on the other hand, is the resultant special purpose computer that is the combination of logical partition with operating system image. The operating system may be called an OS instance, when the operating system is identical in computer instructions and co-exists in a common structure with other operating system instances. In other words, the operating system (instance) is the specific operating system image coupled to the specific logical partition (or alternatively general purpose computer).

Accordingly, hypervisor 203 may configure and maintain the resource allocations in CEC 1 201. For example, hypervisor 203, under the control of an administrator, may allocate shared memory or physical memory 220 among the plural logical partitions 211, 212, 213, 214 and 215. LPARs that host an operating system image may be called operating system 231, 232, 233, 234 and 235. Accordingly, during the use of LPARs 211-215 for productive work, the LPARs may be referred to as operating systems 231-235, and are synonymous for as long as an operating system is loaded into the resources and invoked by a boot-up process of the corresponding LPAR. The allocated shared memory is physical memory. A physical memory is low-latency memory that returns contents within a few processor clock cycles. Physical memory can be, for example, local memory 109 comprising dynamic random access memory (DRAM). Physical memory is distinguishable from virtual memory which, in contrast, may be stored in a block device, offsite, or in some other high-latency storage arrangement. Physical memory is tangible, whereas virtual memory is an abstraction of memory and storage that can extend the apparent size of physical memory with some performance tradeoffs. The virtualization of physical memory made available to the Operating System (OS) is a virtualization function provided by the OS (i.e. the hypervisor is not involved with physical memory virtualization). Each LPAR may take its allotment of shared memory and further specifically allocate it to form a remote memory buffer (RMB), explained further, below. RMBs 241-245 are allocated to each of LPARs 211-215, respectively. Similarly, RMB 271 is allocated within LPAR 261.

In the process of configuring CEC 1 201 for operation, hypervisor 203 can segregate isolated shared memory 226 for use solely in communicating between LPARs of the CEC, as well as to LPARs in neighboring CECs, as will be explained below. In other words, a shared memory buffer can be described by a data structure that identifies the portion of physical memory reserved as a shared memory buffer, whether such memory is enabled, and the identity of the LPARs authorized to access the shared memory buffer. Shared memory buffer 221 can be one of several shared memory buffers created to facilitate communications between two logical partitions. The enablement and initial setup of shared memory buffers is described in one or more of patent application Ser. No. 13/246,028 titled "Using Transmission Control Protocol/Internet Protocol (TCP/IP) To Setup High Speed Out Of Band Data Communication Connections", and Ser. No. 13/494,831 titled, "Redundancy In Shared Memory Communications", which are herein incorporated by reference.

CEC 1 201 connects to CEC 2 251 via LAN 250. CEC 2 251 may rely on an additional hypervisor, namely hypervisor 253. As such, hypervisor 253 can similarly arrange LPARs 261, 263 and 265 to each be allocated portions of memory 270.

The creation and destruction of LPARs is at the control of an administrator, who directly or indirectly presents credentials that authenticate the administrator as authorized to perform administrative functions. Administrative functions include, but are not limited to, the operation of commands as a 'super-user' within UNIX and similarly styled operating systems. It is appreciated that administrative authority can be divided among multiple administrators with each having distinct or overlapping levels of authority to configure a CEC.

A shared memory pool is memory shared among one or more LPARs in a CEC, and may include memory that is not allocated. In other words, the shared memory is segregated for special purposes. Physical memory 220 and 270 are examples of shared memory pools.

Communication functions between LPARs of a common CEC, as well as between LPARs hosted on different CECs, can occur via software components that emulate the operation of a network interface card (NIC), but exclude some of the overhead functions of a conventional NIC. The communication function can be supported in remote memory buffer 241, and is further described in patent application Ser. No. 13/494,831 titled, "Redundancy In Shared Memory Communications", which is herein incorporated by reference.

Figure 3:
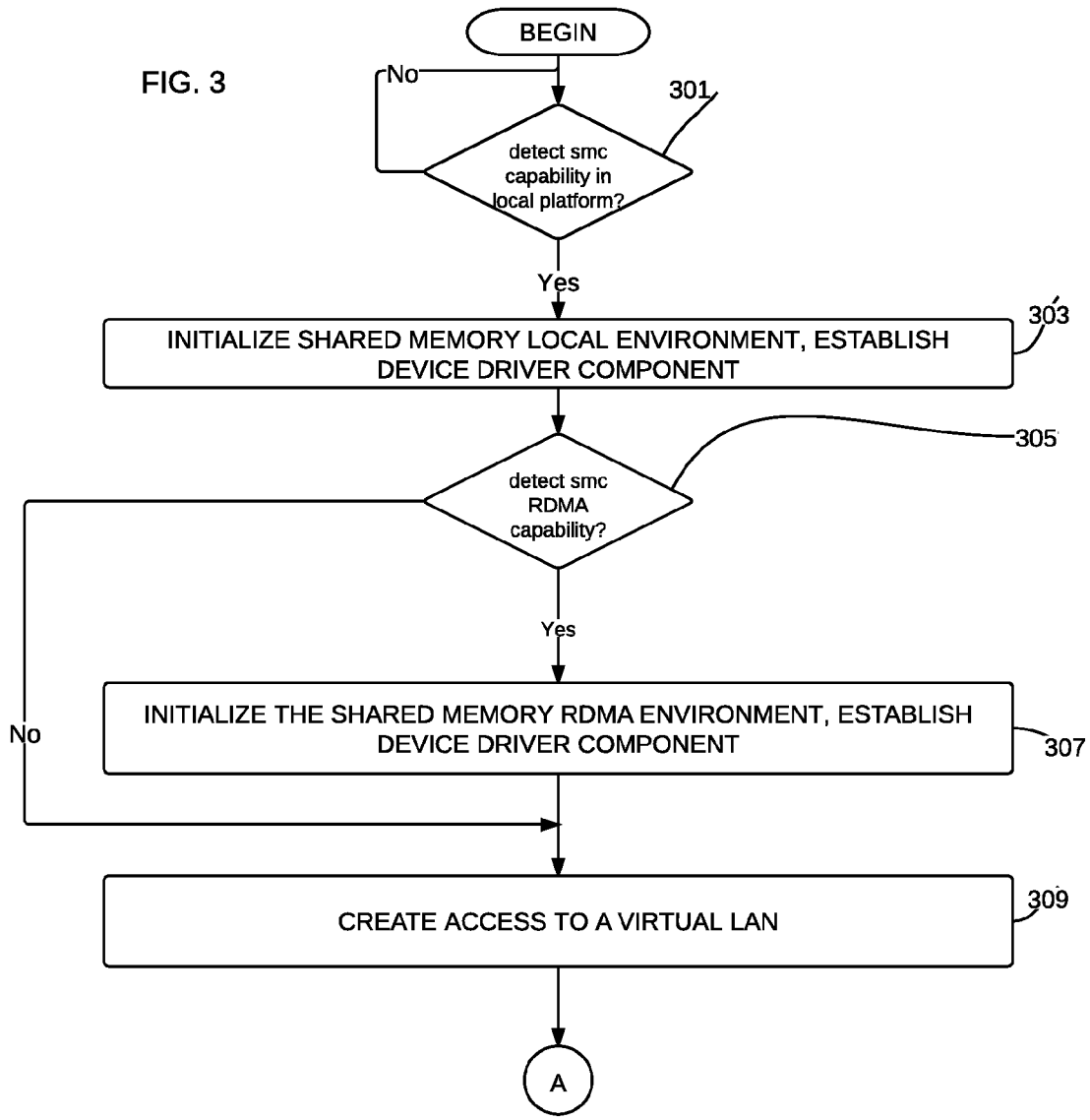
FIG. 3 is a flowchart of steps performed by a hypervisor to initially setup the shared memory buffer in accordance with an illustrative embodiment of the invention.

FIG. 3 is a flowchart of steps performed by a hypervisor to initially setup the shared memory buffer in accordance with an illustrative embodiment of the invention. Initially, a hypervisor detects shared memory communication (SMC) capability in a local platform. (step 301). If no SMC capability is present, step 301 may repeat. A positive determination at step 301 may result in the operating system initializing shared memory local environment and establishing a device driver component (Step 303). Next, the hypervisor may detect SMC RDMA capability (step 305).

A positive result at step 305 may result in the operating system initializing the shared memory RDMA environment, and establish a device driver component (step 307). Next, or in response to a negative determination at step 305, the hypervisor may create access to a VLAN (step 309). Any shared memory buffers (SMBs) in use, for example at step 303 may be, for example, shared memory buffer 221 of FIG. 2. As such, the shared memory buffer (SMB) may be used solely for the purpose of communicating between logical partitions.

As part of setting up or creating each LPAR, the hypervisor may establish an address by which communications are directed. An address is a unique identifier of the LPAR that permits it to specifically receive data within a data processing system. An address may be an Internet Protocol (IP) address, for example.

Control over the SMB may now be jointly held by the LPAR 1 and LPAR 2. According to communication protocols, each of LPAR 1 and LPAR 2 may exchange data in reliance on the SMB. Accordingly, one or both LPARs may place request data, response data or streaming data in the shared memory. Such communication functions may persist indefinitely. For convenience, the embodiments describe a LPAR as performing each of the remaining steps in FIG. 3. However, it is appreciated that the two or more LPARS authorized to access the SMB may singly or jointly conduct the following steps.

Processing may continue at step 401 of FIG. 4, below.

Figure 4:
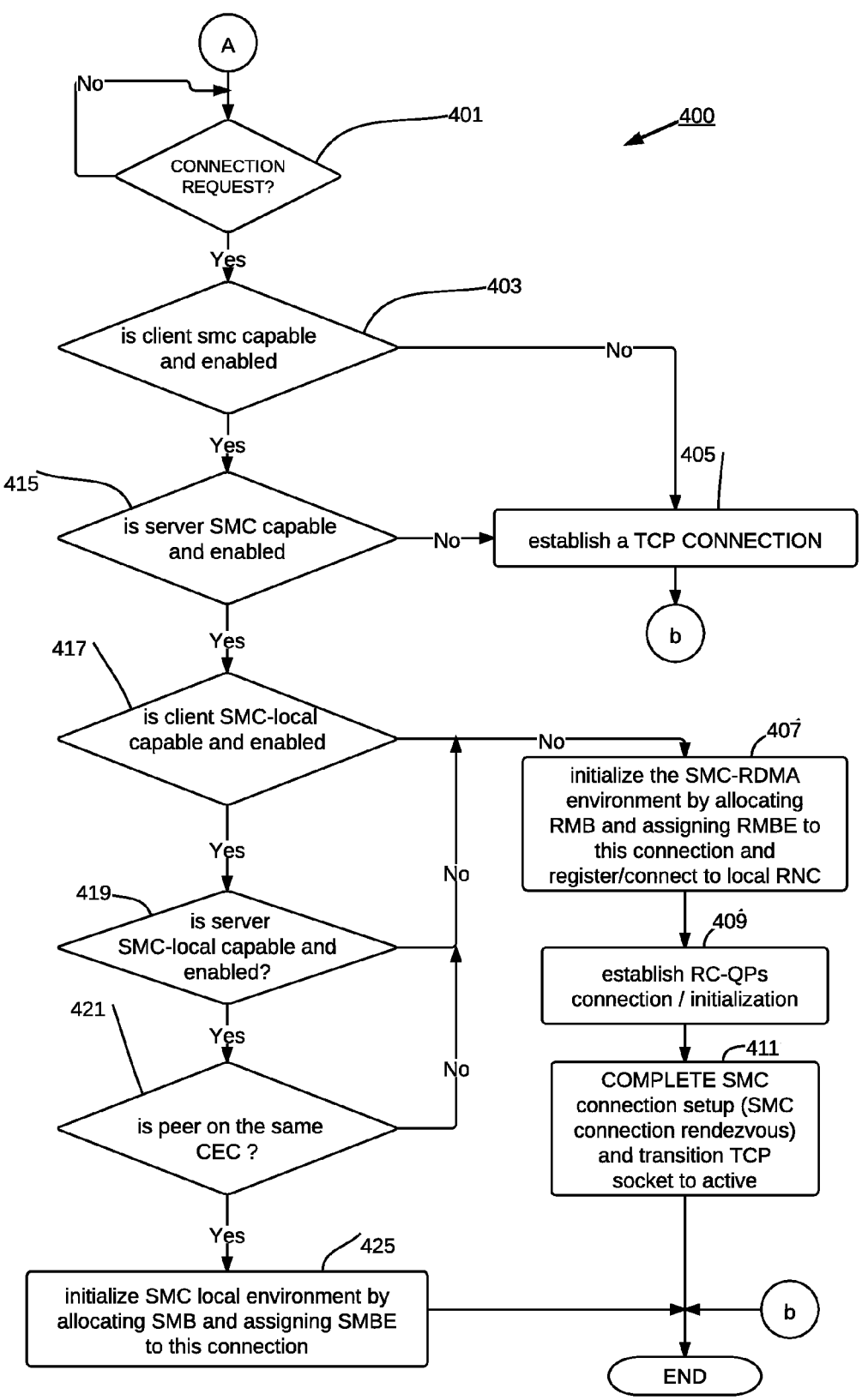
FIG. 4 is a flowchart of connection establishment in intra-CEC and inter-CEC situations in accordance with an illustrative embodiment of the invention.

FIG. 4 is a flowchart of connection establishment in intra-CEC and inter-CEC situations in accordance with an illustrative embodiment of the invention. The steps of flowchart 400 may be a logical continuation following of step 309 of FIG. 3. Initially, an OS within an LPAR may determine if a TCP/IP connection request has occurred (step 401). The connection request can be from either a software component native to the LPAR, or from an operating system operating within a LPAR on the VLAN. See for example, Ser. No. 13/246,028 titled "Using Transmission Control Protocol/Internet Protocol (TCP/IP) To Setup High Speed Out Of Band Data Communication", incorporated by reference herein. An origination LPAR is an LPAR that originates the connection request. The origination LPAR is sometimes called the client. A targeted LPAR is an LPAR that is named in the connection request as a recipient or other form of correspondent in the communication. The targeted LPAR is sometimes called the server. If no connection request occurs, the LPAR may repeatedly test for connection requests by repeating step 401.

As such, an LPAR that is using allocated memory of a CEC is said to be 'within' or 'on' the CEC, and can, in some cases, be a origination LPAR formed from resources on the common CEC to a targeted LPAR. Processing may terminate thereafter.

However, a positive result at step 401 can result in a determination whether the client is SMC capable and enabled (step 403). If so, a determination is made whether the server is SMC capable and enabled (step 415). A negative determination at steps 403 or 415 can cause the LPAR to establish a TCP connection (step 405). Processing may terminate thereafter.

If step 415 is positive, the SMC component may determine whether the client is SMC-local capable and enabled (step 417). If so, the SMC component further determines if the server is SMC-local capable and enabled (step 419). If so, the SMC component further determines whether the peer is on the same CEC (step 421). If any of steps 417, 419 or 421 are negative, the SMC component may initialize the SMC-RDMA environment by allocating a RMB and assigning a remote memory buffer element (RMBE) element to this connection and registering or connecting to a local RNIC (step 407). An RMBE is a sub-part to an RMB. Nevertheless, if an RMB is already available on the local LPAR, this step can be skipped. A remote memory buffer (RMB) is a buffer established according to the conventions of shared memory communications, remote, further defined by patent application Ser. No. 13/246,028.

Following step 407, the SMC component may establish RC-QPs for connection and initialization (step 409). Next, the SMC component may complete the SMC connection setup and transition the corresponding TCP socket to an active state (step 411). Processing may terminate thereafter.

A positive determination at step 421 may cause the SMC component to initialize a SMC local environment by allocating a SMB and assigning a SMBE to this connection (step 425). SMB can be, for example, shared memory buffer 221 of FIG. 2. Processing may terminate thereafter.

Figure 5:
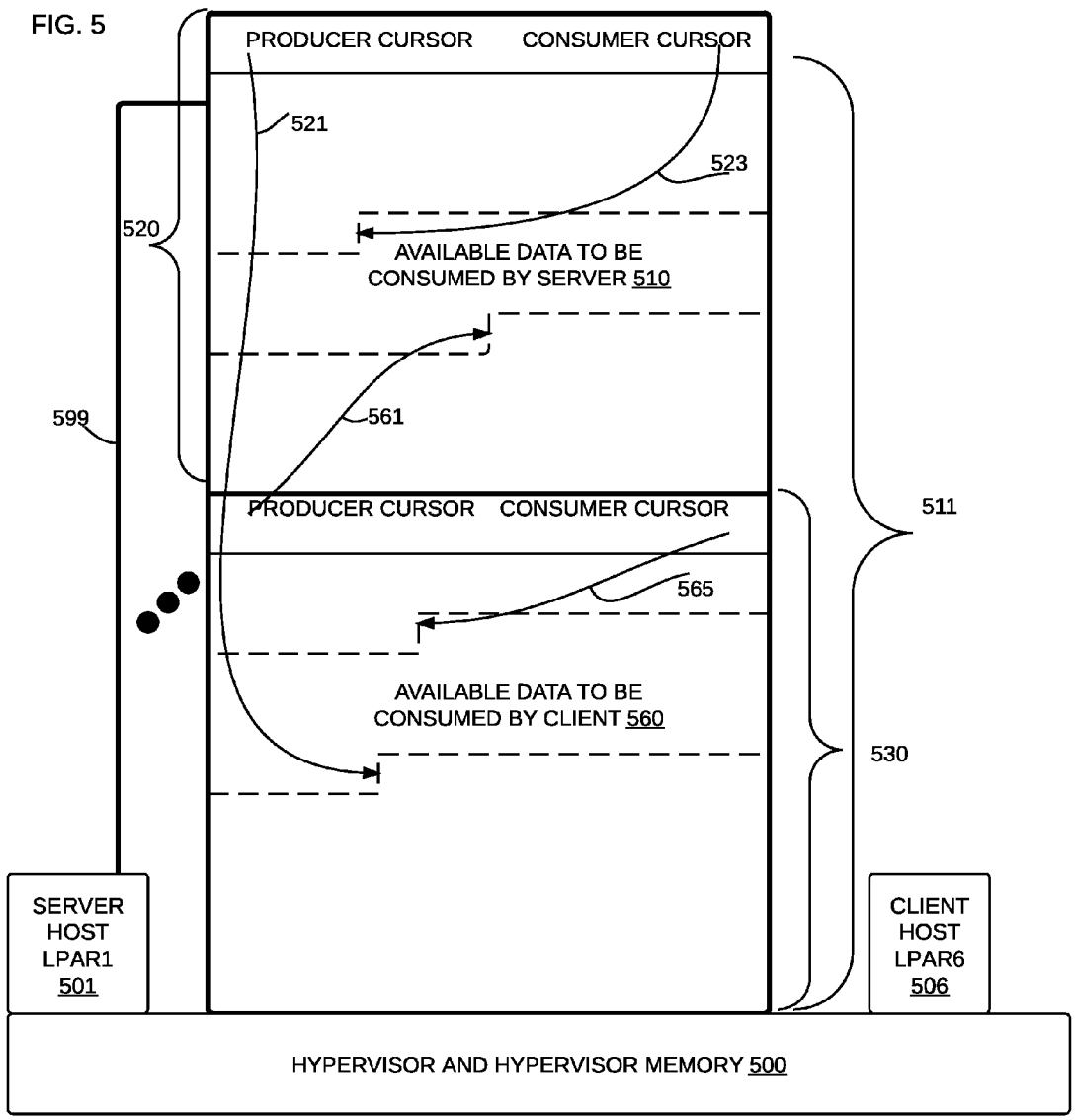
FIG. 5 is an illustration of a shared memory buffer in accordance with an illustrative embodiment of the invention.

FIG. 5 is an illustration of a shared memory buffer in accordance with an illustrative embodiment of the invention. The shared memory buffer is used to exchange data between logical partitions that are hosted and controlled by a common hypervisor, such as hypervisor and hypervisor memory 500. A shared memory buffer is comprised of shared memory buffer elements, such as shared memory buffer element SMBE 511. An indefinite number of SMBEs may be managed by the SMC component. These additional SMBEs include SMBE 599, for example. Each SMBE provides writable memory for information that flows from a server host to a client host and flows from a client host to a server host. These two flows make up a connection. The SMBE can handle such flows in circular buffers that rely on two pointers or references to identify a beginning and an end to data that awaits action by an application. A first part is the server-related portion 520. The second part is the client-related portion 530. A server-related portion is that portion of memory that includes a server producer cursor, such as, for example producer cursor 521. This portion also includes consumer cursor 523 as well as available data to be consumed by the server 510. The available data is a dynamic portion of data that can be moved through a reserved memory space in the manner of a circular buffer, such that a beginning of the available data is referenced by consumer cursor 523 and an end of the available data is referenced by producer cursor 561 of the client host, explained below.

Similarly, the client-related portion 530 is made up of portions. A client-related portion has its own producer cursor 561 and a consumer cursor 565. The client-related portion also has a dynamic portion of data that, like the server-related portion, can be dynamic and move through reserved memory in the manner of a circular buffer. This dynamic portion is called available data to be consumed by the client 560. Available data 560 is referenced at the beginning by client-related consumer cursor 565 and at the end by server-related producer cursor 521.

As such, the server host LPAR 501 can rely on a TCP layer having SMC features to consume data moved to memory referenced by server-related consumer cursor 523, while the client host LPAR 506 can rely on its own TCP layer having SMC features to consume data moved to memory referenced by client-related consumer cursor 565.

In situations where the server and client are not on the same CEC, then RMBs can be deployed. The RMB has the same format as the SMB, and RMBs are also subdivided into elements (RMBEs), where elements correspond to individual TCP connections. The SMBE format of FIG. 5 is identical to the RMBE format. However, the RMBE is logically divided in half, whereby each host provides their peer with an RMBE to produce (write) data. The provider of the RMBE then consumes (reads) data that is produced by their peer. The shared memory operations, provided by the shared memory component, is identical for SMBEs and RMBEs. Shared memory operations include producing data and consuming data.

A separate data structure can signal which among several SMBEs currently has additional data ready to be consumed by an application. A connection bit status array is a data structure that identifies which among several connections of an SMB contains such data ready to be consumed. In other words, for each SMB, an indicator within the connection bit status array indicates whether, on one hand, data is present on a connection, and on the other hand, data is not present on a connection. To be present on a connection, the two cursors or references that point to available data must not point to the same memory address. For example, both the server and the client have data available as pictured in FIG. 5. RMBs deploy an alert token that allows the consumer to find an RMBE with pending work that was produced by the peer.

Figure 6:
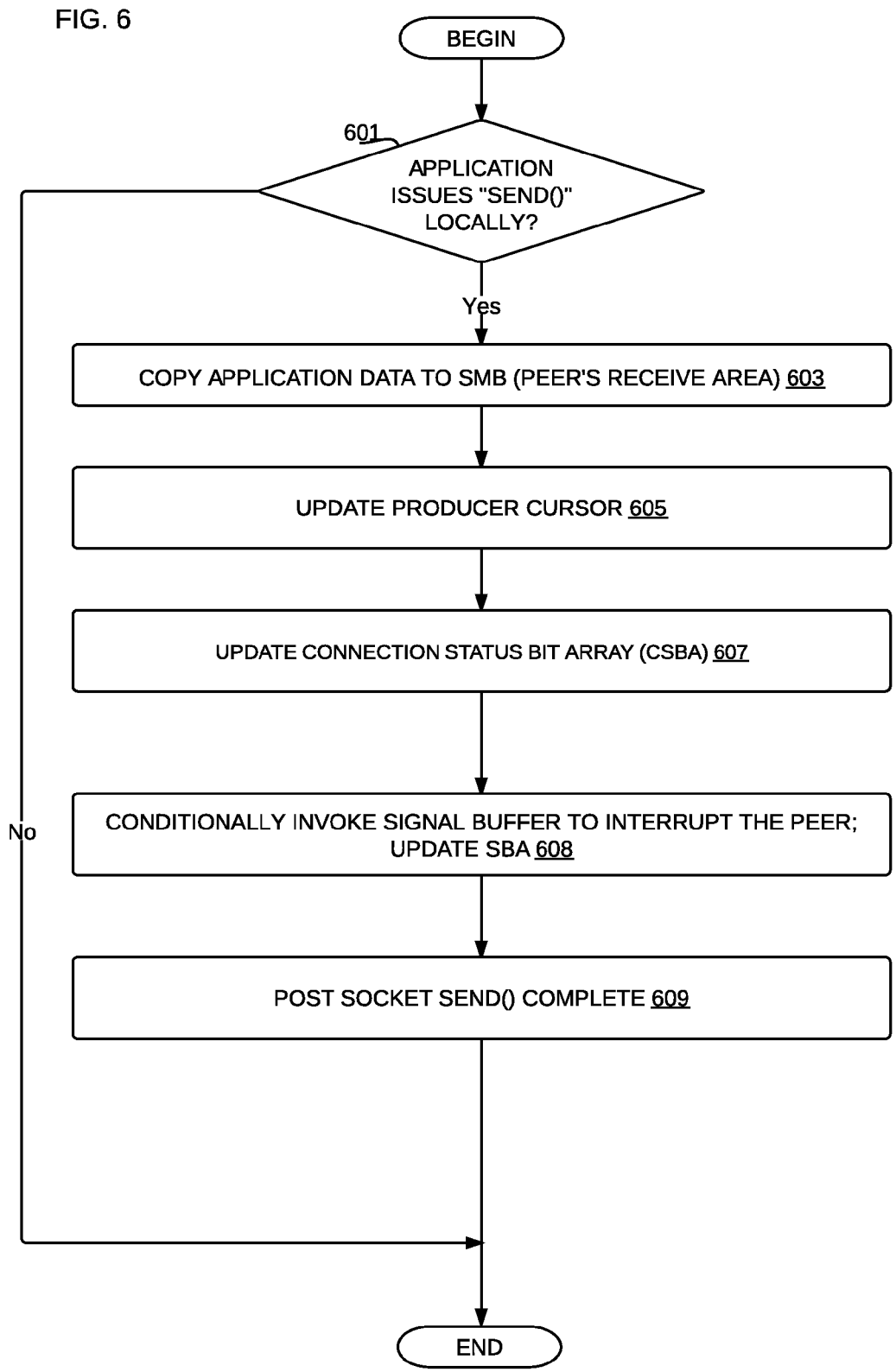
FIG. 6 is a flowchart of operations, responsive to an application issuing a send operation in accordance with an illustrative embodiment of the invention.

FIG. 6 is a flowchart of operations, responsive to an application issuing a send operation in accordance with an illustrative embodiment of the invention. A send is a function used to transmit a message to another socket. Initially, an SMC component may detect an application issued send operation (step 601). An SMC component is a software component that enhances the operation of the TCP/IP layer in a communication stack so that in some cases, where communication is local and suitable resources exist, the steps of packetization and packet ordering are eliminated. Accordingly, the SMC component can respond to requests from an application layer and other layers above the TCP/IP layer to communicate with the world outside the logical partition. An application is a software component that relies on data processing resources to perform as guided by instructions. The application can be limited to operating at times and with such resources as are available through an operating system, as well as other software components that are part of, or otherwise work with, the operating system. An application issued send operation is an instruction that indicates that the application has data prepared to pass to a lower communication layer for eventual transmittal to another logical partition or other isolated machine. If the SMC component does not detect an application-issued send, processing may terminate thereafter.

Otherwise, the SMC component may copy application to the SMB (step 603). More specifically, the SMC component may copy the application data to the peer LPAR's receive area, for example, client-related portion 530 of FIG. 5. Application data is data that is provided by the application. Next, the SMC component may update the producer cursor (step 605). The producer cursor may be producer cursor 521 of FIG. 5. Next, the SMC component may update connection status bit array (CSBA) (step 607). The status bit array is memory that is allocated to either the SMB owner or the peer for notifying its counterpart that data is available. This notification can be accomplished using a signal token. The SMC component may do this update by issuing an SM-move to the SMB header. The SM-move can change a bit that is associated with the unique connection between a sending logical partition and a receiving logical partition. Periodic referencing of the CSBA by all logical partitions can operate as a signal to a targeted logical partition that data is being made available to it.

Next, the SMC component may conditionally invoke a signal buffer to interrupt the peer LPAR and update the status bit array (SBA) (step 608). An SIGB is a specific form of interrupt. It is appreciated that other forms of interrupt may be used. Next, the SMC component may post a socket send complete (step 609). A socket send complete is a signal from the OS to application. Processing may terminate thereafter.

Figure 7:
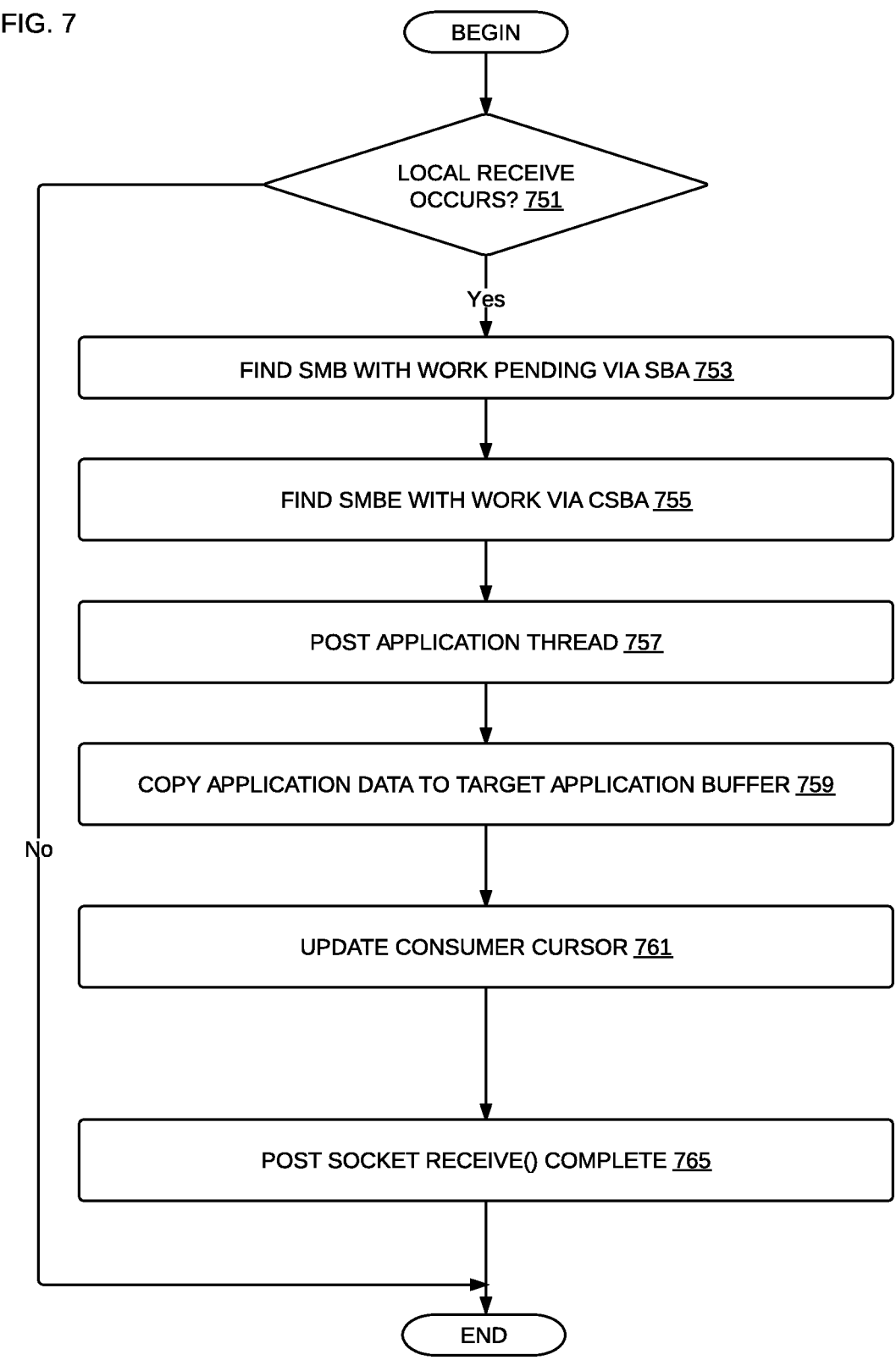
FIG. 7 is a flowchart of operations at a targeted logical partition for local receive processing via a socket application programming interface (API) in accordance with an illustrative embodiment of the invention.

FIG. 7 is a flowchart of operations at a targeted logical partition for local receive processing via a socket application programming interface (API) in accordance with an illustrative embodiment of the invention. Initially the SMC component may determine if a local receive occurs (step 751). Next, the SMC component may find the SMB with work pending via SBA (step 753). The SMC component can further narrow down the specific location of the pending work, or available data, by finding the shared memory buffer element (SMBE) in reliance on the connection status bit array (CSBA) (step 755). The CSBA can indicate pending work or data ready to be consumed. Step 755 may be performed responsive to receiving the interrupt. Pending work is data that exists between a consumer cursor and a producer cursor that references a client-related portion in the instance that the application occupies the position of client. Next, the SMC component may post the application thread (step 757).

Next, the SMC component may copy application data to the target application buffer (step 759).

Next, the SMC component updates the consumer cursor (step 761). Next, the SMC component may post a socket receive complete (step 765). The local consumer cursor or targeted logical partition's consumer cursor is the cursor that points to a beginning of data obtained from a logical partition other than the one that hosts the application. This logical partition may be referred to as the producer logical partition. The producer logical partition will write next, if at all, in relation to the connection, at the peer producer cursor. Accordingly, when the local consumer cursor matches the peer producer cursor, no further data is available to be read by the local application or logical partition, since its peer has not yet added more data in a manner to advance the peer producer cursor beyond the local consumer cursor. Processing may terminate thereafter. Processing terminates thereafter.

FIG. 8A is a flowchart of RDMA send processing in accordance with an illustrative embodiment of the invention. Initially, the SMC component determines whether the application issues a send (step 801). If the application issued a send, the SMC component may copy application data to an OS or kernel staging buffer (step 803). Next, the SMC component may RDMA write user data (step 805). Next, the SMC component may write control information (step 807). Step 807 can include three sub-steps. First, the SM component may send an alert token in a manner that defines the RMBE. Second, the SMC component may update the producer cursor. Third, the SMC component may indicate to raise an interrupt. A send is a socket-layer request to transmit data specified in the send. A kernel memory is memory controlled by the operating system.

Next, the SMC component may post a socket send complete (step 809). Following a negative result to step 801 and after step 809, processing may terminate.

Figure 8B:
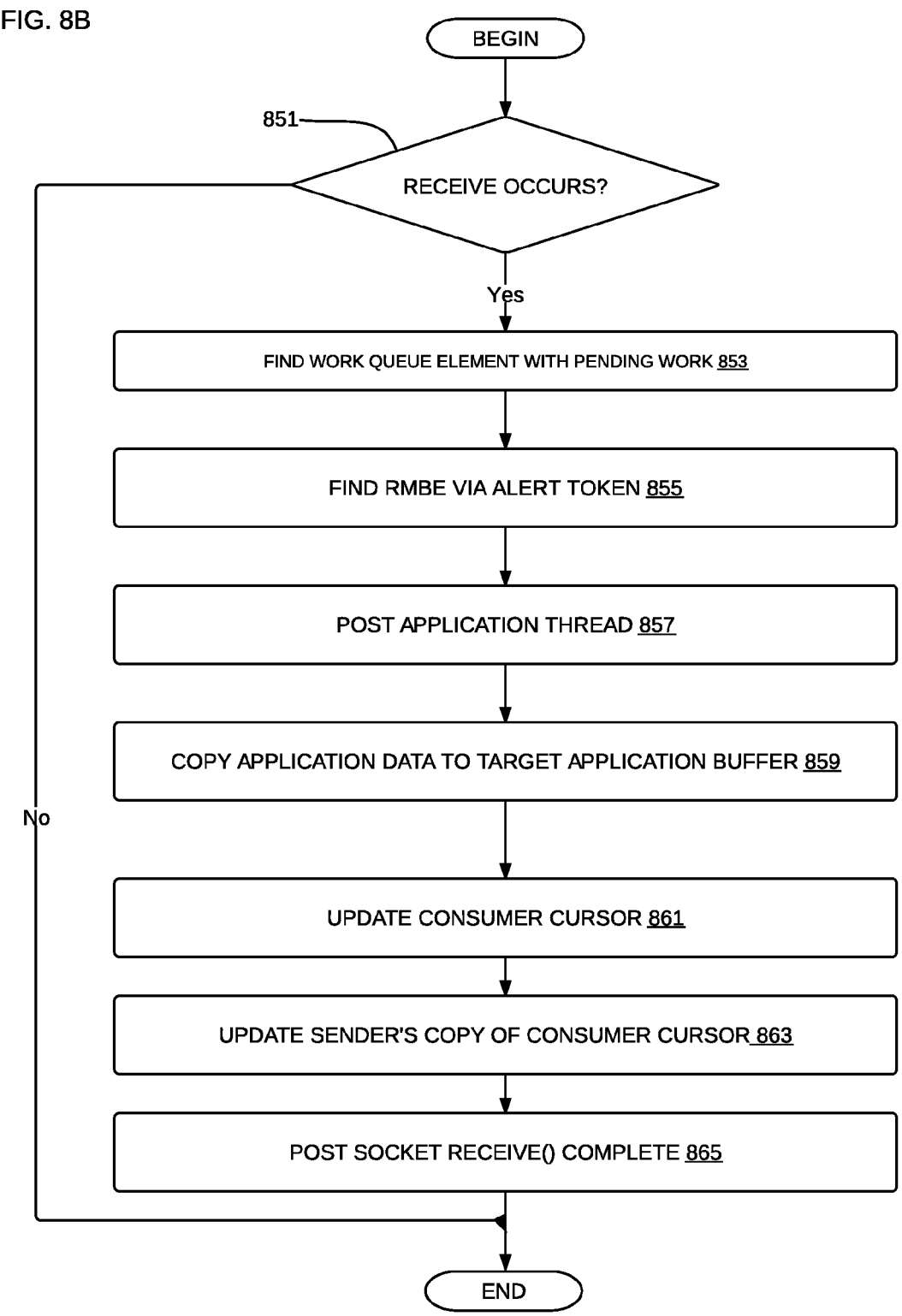
FIG. 8B is a flowchart of RDMA receive processing in accordance with an illustrative embodiment of the invention.

FIG. 8B is a flowchart of RDMA receive processing in accordance with an illustrative embodiment of the invention. Initially, the SMC component determines whether a receive occurred (step 851). Next, the SMC component may find the work queue element with pending work (step 853). Next, the SMC component may find the RMBE via an alert token (step 855). Next, the SMC component may post an application thread (step 857).

The SMC component, may next copy application data to a target application buffer (step 859). Next, the SMC component may update a consumer cursor (step 861). Next, the SMC component may update the sender's copy of the consumer cursor (step 863). Next, the SMC component may post a socket receive complete (step 865). Processing may terminate after step 865 and a negative outcome to step 851.

Figure 9:
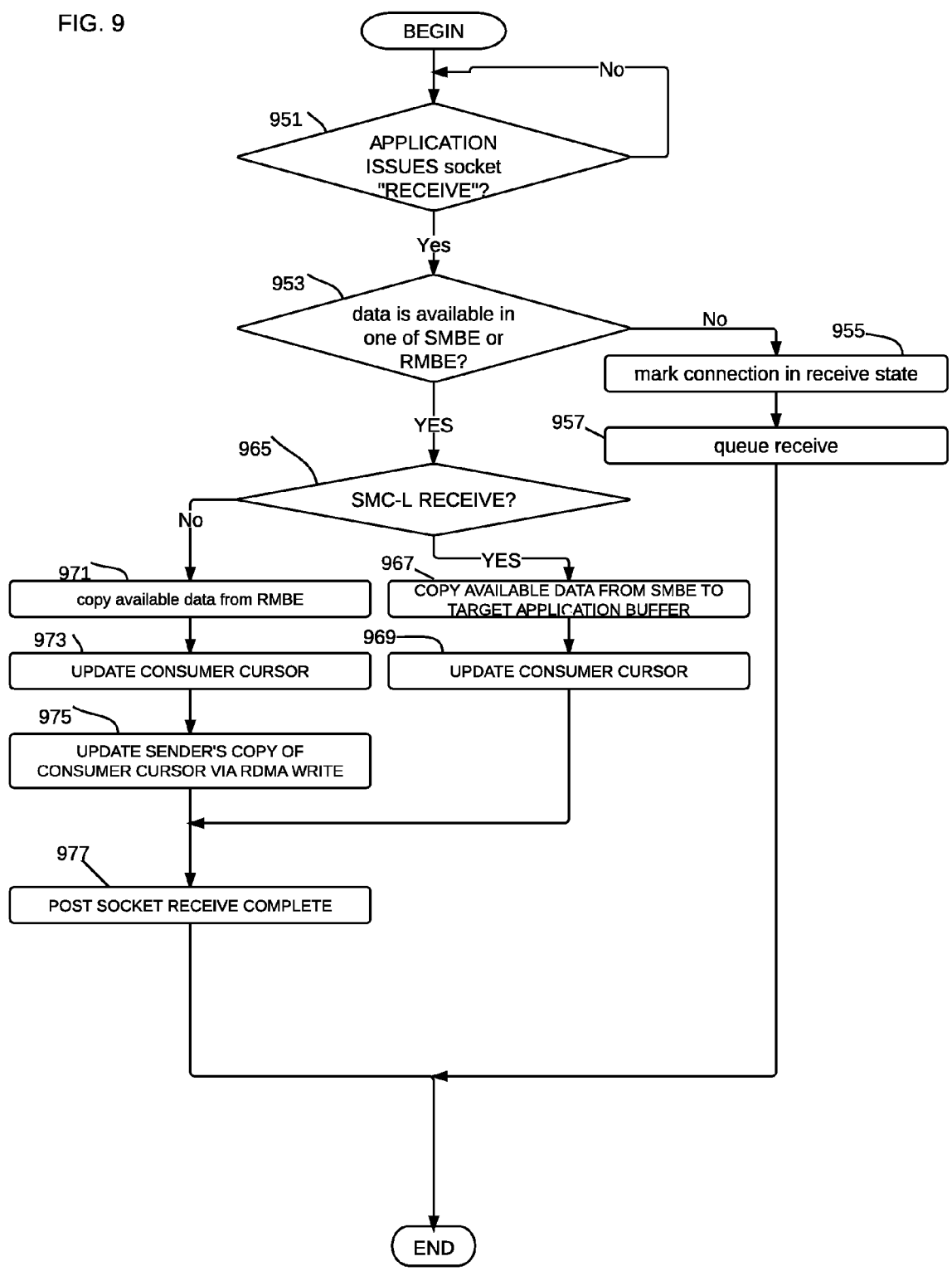
FIG. 9 is a flowchart of socket receive processing in accordance with an illustrative embodiment of the invention.

FIG. 9 is a flowchart of socket receive processing in accordance with an illustrative embodiment of the invention. Initially, the SMC component may determine that an application issued a receive operation (step 951). If no receive is issued, then the SMC component may repeat step 951. On the other hand, if the receive operation is issued, and remains in effect, the SMC component may determine whether data is available in one of the SMBE or RMBE (step 953). If step 953 is determined to be negative, the SMC component may mark the connection in receive state (step 955). Next, the SMC component queue receive (step 957). Processing may terminate thereafter.

On the other hand, a positive determination at step 953 may cause the SMC component to determine if a SMC local (SMC-L) receive has occurred (step 965). In response to a positive determination, the SMC component may copy available data from SMBE to a target application buffer (step 967). Next, the SMC component may update the consumer cursor (step 969).

However, a negative determination at step 965 can cause the SMC component to copy available data from the RMBE (step 971). Next, the SMC component may update the consumer cursor (step 973). Next, the SMC component may update the sender's copy of the consumer cursor via RDMA write (step 975).

After either steps 969 or 975, the SMC component may post socket receive complete (step 977). Processing may terminate thereafter.

Figure 10:
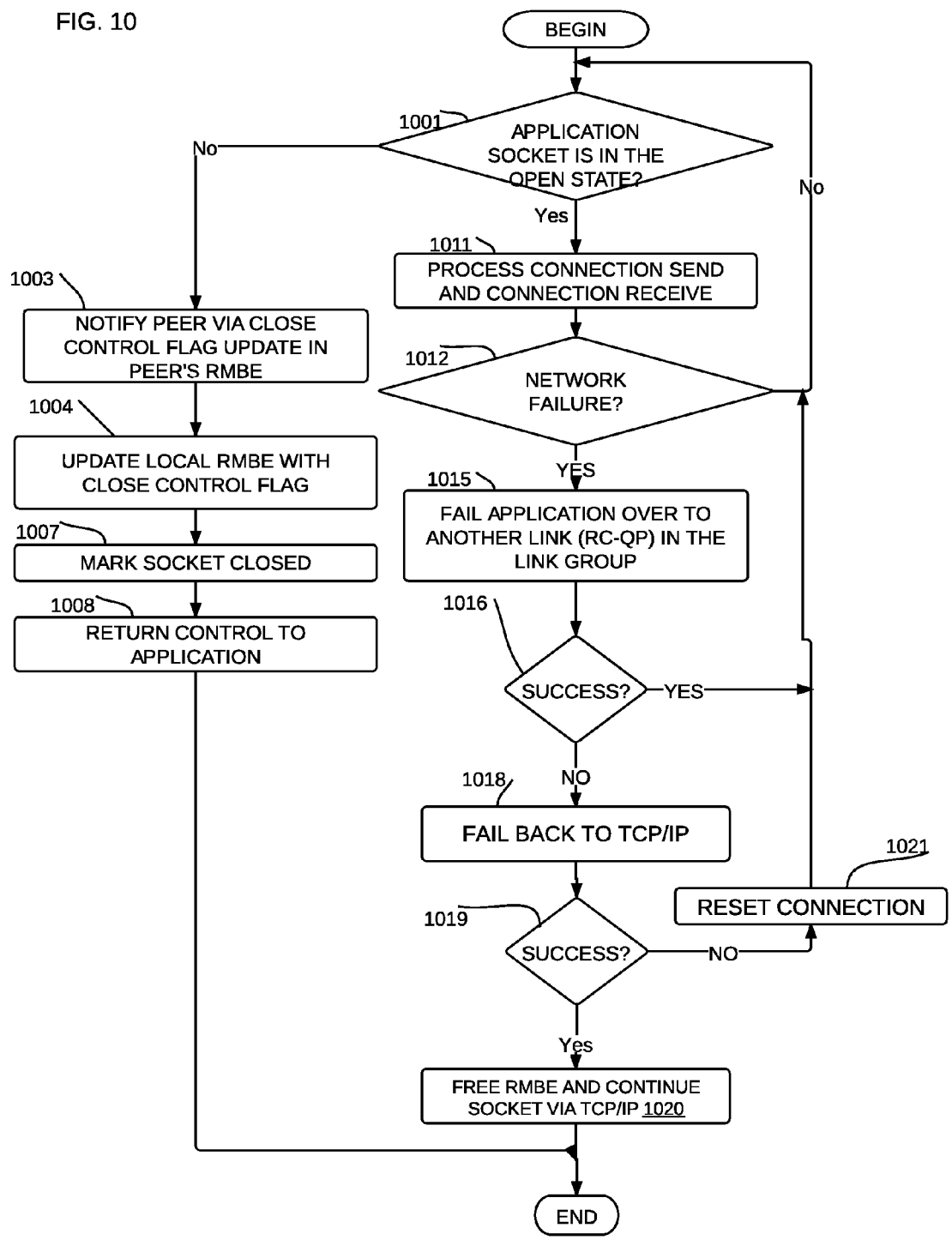
FIG. 10 is a flowchart of terminating or disabling the SMC connection in accordance with an illustrative embodiment of the invention

FIG. 10 is a flowchart of terminating or disabling the SMC connection in accordance with an illustrative embodiment of the invention. Initially, the SMC component determines if the application socket is in the open state (step 1001). An application socket is a socket accessed by the application. Such a determination can confirm that a socket is active. If so, the SMC component may process a connection send and a connection receive (step 1011). Next, the SMC component may determine whether there has been a network failure (step 1012). In other words, the SMC component can determine if a connection has failed. A negative determination at step 1012 can result in the application continuing to use the link or path, causing the SMC component to continue at step 1001. Next, in response to a positive determination at step 1012, the SMC component may fail the connection over to another link in the link group (step 1015) provided another available link exists within the link group. The other link may be a RC Queue Pair (RC-QP). Accordingly, the SMC component may determine whether the attempt to use another link succeeded (step 1016). If successful, the processing may resume at step 1001. When at least one other link exists, the SMC component may transmit data of the application over the available link. However, when no other links exist, the result will be negative. If no other links exist, the SMC component will sync and attempt to fail back to TCP/IP (step 1018). This attempt to fail back is tested for success (step 1019). If successful, then the SMC component terminates the SMC connection (RMBE) and the socket application continues to communicate over TCP/IP (step 1020). If unsuccessful, the SMC component resets the socket connection (step 1021). Processing may terminate after steps 1008 or 1020.

In response to a negative determination at step 1001, the SMC component may notify a peer via a close control flag update in the peer LPAR's RMBE (step 1003).

Next, the SMC component may update the local RMBE with the close control flag (step 1004). Next, the SMC component may mark the socket closed (step 1007). Next, the SMC component may return control to the application (step 1008). Processing may terminate thereafter.

A shared memory communications protocol can coordinate the placement of data into a ring buffer for eventual consumption by an application by providing suitable interrupts or, alternatively, indications that data has been placed into the ring buffer. The ring buffer, being outside the exclusive control of a logical partition, can obviate the execution of processing intensive functions that were necessary by the prior art. Such eliminated processing can include TCP/IP functions that include the formation and interpreting of packets and their header data. Accordingly, fewer data moves may be needed in circumstances where a logical partition operates inside a common CEC with a peer logical partition.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, one or more embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage device(s) may be utilized. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer-readable storage device" does not encompass a signal propagation media such as a copper cable, optical fiber and wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for receiving data to a targeted logical partition, the computer program product comprising: a computer readable tangible storage device having computer readable program code embodied therewith, the computer readable program code, that when executed by a processor, performs the steps of:
    receiving an interrupt;
    locating a shared memory buffer element that has pending work in reliance on a connection status bit array, wherein the connection status bit array indicates, using a single bit, the shared memory buffer element that has data waiting among a plurality of shared memory buffer elements, wherein locating the shared memory buffer (SMB) element in reliance on a connection status bit array is responsive to receiving the interrupt;
    determining that an application completes a receive operation;
    copying data to an application receive buffer;
    updating a targeted logical partition's local consumer cursor to match the targeted logical partition's producer cursor, responsive to a determination that the application completed the receive operation;
    copying data from a remote memory buffer element responsive to a determination that the application has not completed the receive operation; and
    posting socket receive complete.

2. The computer program product of claim 1, further comprising computer readable program code, that when executed by a processor, performs the step of:
    determining that data is available based on a local producer cursor of the targeted logical partition.

3. The computer program product of claim 2, wherein the computer readable program code, that when executed by a processor, performs the step of locating the shared memory buffer element responsive to locating the SMB element that has pending work.

4. The computer program product of claim 1, further comprising
    computer readable program code, that when executed by a processor, performs the step of determining that the application issued a receive operation, wherein locating the SMB element that has pending work is responsive to a determination that the application issued the receive operation.

5. The computer program product of claim 1, further comprising computer readable program code, that when executed by a processor, performs the steps of:
    detecting an application issued send operation;
    moving data to the shared memory buffer element data area assigned to the targeted logical partition, responsive to detecting the application issued send operation;
    updating the shared memory buffer header connection status bit array (CSBA) with details of the data;
    issuing the interrupt to the targeted logical partition; and
    returning program control to the application.

6. The computer program product of claim 5, further comprising
    computer readable program code, that when executed by a processor, performs the step of detecting the application issued send operation, wherein moving data to the shared memory buffer data area assigned to the targeted logical partition is responsive to detecting the application issued send operation.

* * * * *